US009513132B2

(12) United States Patent
Fowe

(10) Patent No.: US 9,513,132 B2
(45) Date of Patent: Dec. 6, 2016

(54) MEASURING QUALITY IN OPTIMAL NAVIGATION ROUTES BY NAVIGATION SYSTEMS

(71) Applicant: HERE Global B.V., Veldhoven (NL)

(72) Inventor: James Adeyemi Fowe, Evanston, IL (US)

(73) Assignee: HERE Global B.V., Eindhoven (NL)

(*) Notice: Subject to any disclaimer, the term of this patent is extended or adjusted under 35 U.S.C. 154(b) by 292 days.

(21) Appl. No.: 14/465,531

(22) Filed: Aug. 21, 2014

(65) Prior Publication Data

US 2016/0054135 A1  Feb. 25, 2016

(51) Int. Cl.
*G01C 21/34* (2006.01)
*G01C 21/30* (2006.01)

(52) U.S. Cl.
CPC .............. *G01C 21/34* (2013.01); *G01C 21/30* (2013.01); *G01C 21/3446* (2013.01)

(58) Field of Classification Search
CPC ...... G01C 21/34; G01C 21/30; G01C 21/3446
See application file for complete search history.

(56) References Cited

U.S. PATENT DOCUMENTS

| 5,928,307 A | 7/1999 | Oshizawa et al. |
| 5,931,888 A | 8/1999 | Hiyokawa |
| 7,522,997 B2* | 4/2009 | Asahara ............. G01C 21/3415 340/905 |
| 8,700,327 B2 | 4/2014 | Cabral |
| 2004/0024524 A1* | 2/2004 | Miyazawa ......... G01C 21/3632 701/431 |
| 2004/0243307 A1* | 12/2004 | Geelen ............... G01C 21/3635 701/469 |
| 2005/0102098 A1* | 5/2005 | Montealegre ...... G01C 21/3484 701/533 |
| 2005/0222760 A1* | 10/2005 | Cabral ............... G01C 21/3492 701/423 |
| 2005/0222764 A1* | 10/2005 | Uyeki ................ G01C 21/3415 701/414 |
| 2005/0251324 A1* | 11/2005 | Wiener .................. G01C 21/32 701/414 |
| 2007/0248016 A1* | 10/2007 | Ashwood Smith ..... H04L 12/66 370/238 |
| 2007/0290839 A1* | 12/2007 | Uyeki ................ G01C 21/3415 340/539.13 |
| 2009/0197686 A1* | 8/2009 | Bergelt ................... A63F 13/10 463/43 |

(Continued)

*Primary Examiner* — Mussa A Shaawat
(74) *Attorney, Agent, or Firm* — Lempis Summerfield Katz LLC

(57) ABSTRACT

Systems, methods, and apparatuses are provided for measuring quality in optimal navigation routes. A plurality of nodes having latitude and longitude coordinates is received for analysis. The nodes may be map matched with a road network and a traveled route of the navigation device may be determined. Alternative routes may be calculated between the origin and destination of the traveled route at a time after the traveled route is completed. Comparisons may be made between the traveled route and the alternative routes. The comparison data may be used to develop an improved traffic database or the data may be reported to a navigation device or navigation service provider.

15 Claims, 4 Drawing Sheets

(56) References Cited

U.S. PATENT DOCUMENTS

| | | | |
|---|---|---|---|
| 2010/0138146 A1* | 6/2010 | Vogt | G01C 21/3632 |
| | | | 701/533 |
| 2010/0324817 A1* | 12/2010 | Hansen | G01C 21/3415 |
| | | | 701/414 |
| 2011/0276265 A1 | 11/2011 | Husain | |
| 2013/0006517 A1* | 1/2013 | Ofek | G01C 21/3446 |
| | | | 701/411 |
| 2013/0046559 A1* | 2/2013 | Coleman | G06Q 40/08 |
| | | | 705/4 |
| 2013/0103313 A1 | 4/2013 | Moore et al. | |
| 2013/0173159 A1* | 7/2013 | Trum | G01C 21/3617 |
| | | | 701/533 |
| 2015/0023156 A1* | 1/2015 | Csaszar | H04L 45/22 |
| | | | 370/228 |

\* cited by examiner

MEASURING QUALITY IN OPTIMAL NAVIGATION ROUTES BY NAVIGATION SYSTEMS

FIELD

The following disclosure relates to systems, methods, and apparatuses for navigation and routing and, in particular, for measuring quality in optimal navigation routes.

BACKGROUND

Many current navigation devices and systems provide suggested navigation routes using map-only data or historical traffic patterns. Some newer navigation devices and systems have embedded traffic updates designed to re-route drivers via fastest routes when there is traffic congestion or an incident along the original suggested route. Navigation service providers (NSPs) therefore request and receive current traffic information from traffic service providers (TSPs) to better understand current traffic situation and recommend an optimal navigation route. However, given the unpredictable nature of traffic itself, the conditions of the traffic network sometimes change so quickly that a re-routing option may not be available.

It is therefore of interest for personal navigation device (PND) providers to understand how best they are helping their end users (e.g., drivers) and understand if their suggested navigation routes are improving over time. It is also of interest to determine if a traffic forecast algorithm is improving. That is, it is of interest to determine whether an algorithm for a predicted or forecasted traffic pattern in the future is becoming more accurate (e.g., at 20 minutes in the future or 2 hours in the future).

Therefore, there is a continuing effort to provide improved systems, methods, and apparatuses to provide improved suggested navigation routs.

SUMMARY

Systems, methods, and apparatuses are provided for measuring quality in optimal navigation routes. In one embodiment, the method comprises receiving, using a processor, a plurality of nodes from a navigation device, each node comprising latitude and longitude coordinates and a time stamp. The method further comprises determining a traveled route of the navigation device between an origin and destination. The method further comprises calculating an alternative route between the origin and destination at a time after the traveled route is completed.

In another embodiment, the method comprises receiving, using a processor, a plurality of nodes from a navigation device, each node comprising latitude and longitude coordinates and a time stamp. The method further comprises map matching the plurality of nodes with a road network. The method further comprises determining, using the map matched nodes, a traveled route of the navigation device between an origin and destination. The method further comprises calculating a faster alternative route between the origin and destination, at a time after the traveled route is completed, using current real-time traffic data, historical traffic data, forecasted traffic data, posted speed limit data, or combinations thereof. The method further comprises comparing the faster alternative route with the traveled route to provide comparison data including a difference in total travel time between the faster alternative route and the traveled route. The method further comprises reporting the comparison data to the navigation device or a navigation device or service provider.

Apparatuses are also provided for measuring quality in optimal routing paths. In one embodiment, a navigation device comprises at least one processor and at least one memory including computer program code for one or more programs, wherein the at least one memory and the computer program code configured to, with the at least one processor, cause the navigation device to at least perform: (1) receiving plurality of nodes from a navigation device, each node comprising latitude and longitude coordinates and a time stamp; (2) map matching the plurality of nodes with a road network; (3) determining, using the map matched nodes, a traveled route of the navigation device between an origin and destination; and (4) calculating an alternative route between the origin and destination at a time after the traveled route is completed.

BRIEF DESCRIPTION OF THE DRAWINGS

Exemplary embodiments are described herein with reference to the following drawings.

DETAILED DESCRIPTION

Figure 1:
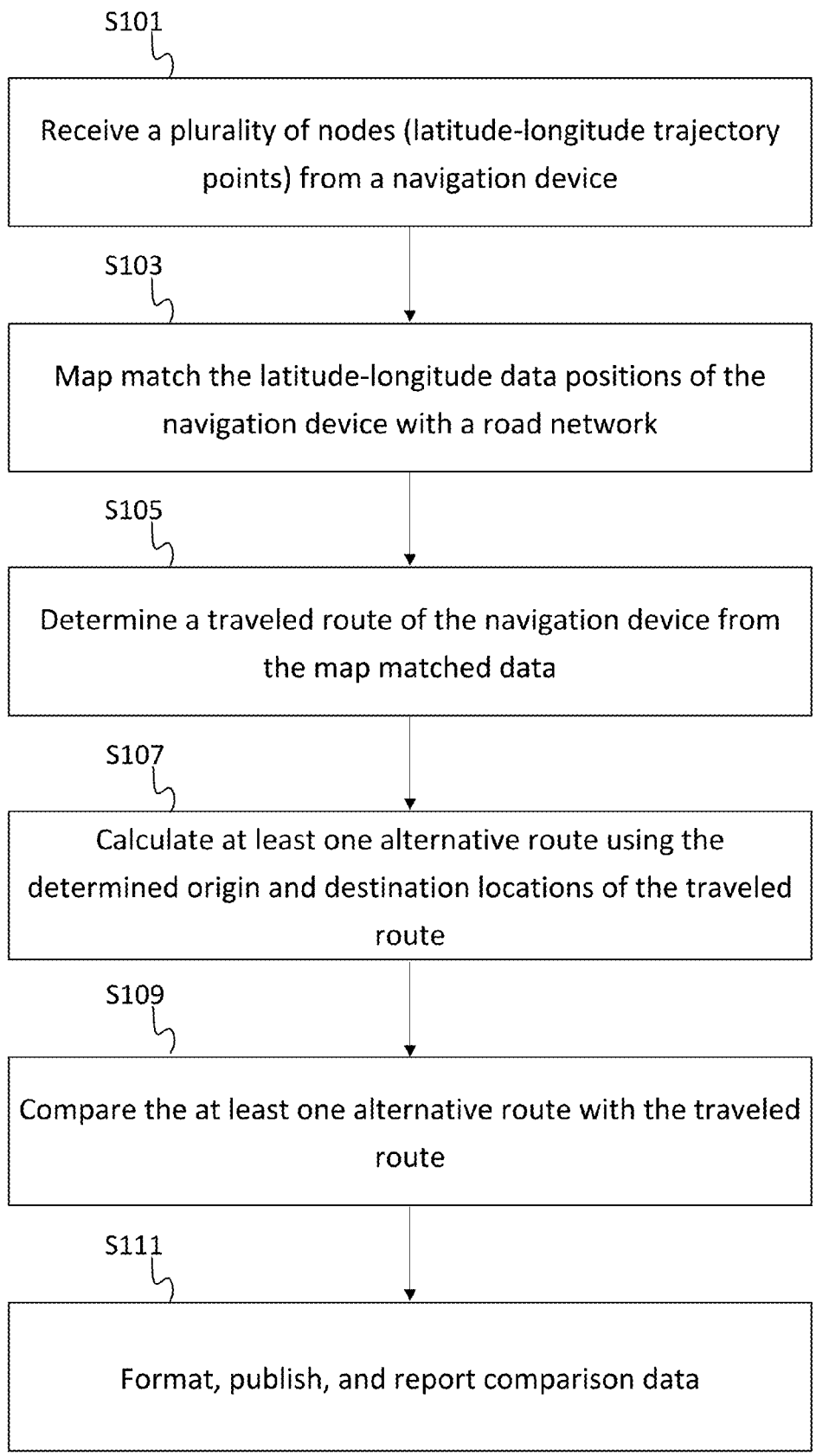
FIG. 1 illustrates an example system for a traffic data management system.

The following embodiments include systems, methods, and apparatuses for measuring quality in optimal navigation routes. In particular, the embodiments described herein provide systems, methods, and apparatuses for improving a navigation route or traffic forecast reported to an end user (e.g., driver) through the use of "after-the-fact" traffic data (e.g., time-dependent traffic data). Through the use of the time-dependent data, a routing or navigation algorithm may be run to cross-check how well suggested navigation routes corresponded with the actual, after-the-fact data. In other words, the systems, methods, and apparatuses described herein provide options for the traffic service provider to provide improved navigation routes to navigation providers or devices.

The embodiments may include: (1) receiving probe or trajectory data from navigation devices wherein the data includes a plurality of latitude-longitude data positions, (2) map matching the data positions to a road network, (3) determining a path taken (i.e., a traveled path) from an origin to a destination, (4) calculating alternative paths the end user may have taken to get from the origin to the destination, (5) comparing the alternative paths with the traveled path, and (6) processing and reporting the comparison data. The embodiments are described in further detail herein. The embodiments, as described herein, may relate to determining alternative navigation paths along highways, city streets, bus routes, train routes, walking pathways, biking pathways, waterways, etc.

As used herein, a "road" may refer to any traveling lane or pathway that may be capable of being monitored (e.g., for traffic congestion or incident detection), or may become capable of being monitored for traffic congestion/incident detection in the future. For example, a "road" may refer to a highway, city street, bus route, train route, walking/biking pathway, or waterway).

As used here, a "road network" may refer to a collection or series of connected roads or roads within a close proximity with one another (e.g., a collection of roads within a town/city/metropolitan area).

Receiving a Plurality of Trajectory Points from a Navigation Device

In certain embodiments, probe or trajectory data from a navigation device may be provided to a processor for analysis. The trajectory data may include information regarding the geographic location of the device at various times. For example, the trajectory data may include a plurality of trajectory points or nodes, each point or node having latitude/longitude information and associated time stamp (e.g., a UTC timestamp).

In addition to the plurality of trajectory points or nodes, the trajectory data may also include vehicle or navigation device identification information, origin and destination location data (latitude/longitude information), or origin and destination times (e.g., UTC timestamps).

In certain embodiments, the navigation device may provide the trajectory data to a map developer (e.g., navigation device/service provider or traffic service provider) for processing and/or analysis. In some embodiments, the navigation device may provide the trajectory data to a navigation device or service provider for processing and/or analysis. The navigation device or service provider may then process and format the data and relay the processed trajectory data to a traffic service provider for analysis. In certain embodiments, the processed trajectory data may include additional information such as navigation device or service provider identification or mode information. For example, the mode information may identify the type of trajectory data received from the navigation device (e.g., navigation data, navigation data with traffic information, or no navigation data). The mode information may be helpful in downstream processing by a traffic service provider to determine whether or not the particular data point should be processed or ignored for a specific analysis. Table 1, shown below, includes one example of the trajectory data provided for analysis.

TABLE 1

Trajectory Data provided for Analysis

| Parameter | Value type |
|---|---|
| Vehicle ID | Alphanumeric |
| Origin Location | Latitude/Longitude |
| Destination Location | Latitude/Longitude |
| Origin Time | UTC timestamp |
| Destination(Arrival) Time | UTC timestamp |
| Trajectory points | Latitude/Longitude and timestamps |
| Navigation Device Mode | 1. Navigation only; 2. Navigation with traffic; 3. No Navigation |
| Navigation Device/Service Provider ID | Alphanumeric |

In certain embodiments, the navigation device may provide the trajectory data to a map developer for processing and/or analysis (and, in some embodiments, bypassing a navigation device or service provider).

In certain embodiments, the trajectory data is provided in a comma-separated value (CSV) file format, text (txt) file format, java script format (e.g., java script object notation or JSON), or extensible markup language (XML) format.

The trajectory data may be extracted or pushed from the navigation device to an external party or map developer (e.g., the navigation device or service provider or traffic service provider) through a hypertext transfer protocol (HTTP) push interface. In some embodiments, the end user of the navigation device (e.g., the driver of the vehicle) may program the device or trigger the device to send the trajectory data to the map developer through a connected network. The end user may program the device to periodically send trajectory data (e.g., every 1 hour, every 2 hours, every 4 hours, every 8 hours, every 24 hours, etc.) In other embodiments, an external party may retrieve the trajectory data through the network without input from the end user of the device. The external party may use a processor to retrieve the trajectory data in a periodic manner (e.g., every 1 hour, every 2 hours, every 4 hours, every 8 hours, every 24 hours, etc.)

Map Matching the Trajectory Data with a Road Network

In certain embodiments, the received trajectory data may be map matched with a road network. The road network may be provided by a map developer (e.g., traffic service provider). Due to positioning inaccuracies (e.g., GPS inaccuracies) of the trajectory data, a trajectory data point's geographic location may not necessarily place the navigation device on an actual road, even though the navigation device is most likely traveling in a vehicle on the road. Thus, an adjustment or map-matching process may be implemented to align the trajectory data with the road.

In a map-matching process, incoming trajectory data may be aligned to the road or a specific lane on the road. The map-matching process may consider both the geographic location and heading of the navigation device in the vehicle or on the traveler. In other words, the map-matching process may compare the distance between the trajectory data and the road, as well as a heading value of the navigation device and heading value of the road.

In certain embodiments, the map-matching process matches the geographic location trajectory data to the road or lane based on characteristic information of the road or lane (e.g., whether the road is a highway, residential street, three-lane road, or two-lane road). Additionally, the map-matching process may take into account the accuracy of the positioning technique for the navigation device in the vehicle or on the traveler. For example, when GPS is used, accuracy depends on the line of sight to the sky. GPS may perform better in open rural areas than in urban areas or areas with other cover.

The database used in the map-matching process may include data indicative of GPS accuracy. The data indicative of GPS accuracy may describe whether or not specific geographic locations are considered an urban canyon, which is defined as an area dominated by tall buildings. Tall buildings may partially block GPS signals. The data indicative of GPS accuracy may indicate city or rural, may be a distance, or may be a value on a rating scale (e.g., 1 to 10). The data indicative of GPS accuracy may be derived from a building model stored in the database. The building model describes the two-dimensional footprint or the three-dimensional size of buildings. The server may access the building model and compare the relative sizes of buildings near the geographic location of the navigation device in the vehicle or on the traveler to a threshold level. Alternatively, the GPS accuracy for different locations is stored and accessed, received from the mobile device, or otherwise calculated.

The map-matching process may also take into account baseline data determined from historical data. The historical data may be location points or nodes collected from navigation devices following the same route. For example, navigation devices within a vehicle or on a traveler may report a current geographic location positioned at a regular interval (e.g., every minute, every 20 seconds). Alternatively, the location points may be collected in response to requests sent from the server. The server may be configured to filter the data. For example, outliers may be removed. In addition, the server may average sets of collected location points to calculate the baseline. The sets of collected location points may be grouped in clusters dependent on the proximity of the location points with respect to one another.
Reconstructing Traveled Path of the Navigation Device In certain embodiments, the map matched navigation points or nodes may be processed to reconstruct the route taken by the navigation device. In some embodiments, the reconstructed route is determined by a graph traversal algorithm or informed search algorithm. For example, the reconstructed route of the navigation device may be determined by a search algorithm such as an A* algorithm, D* algorithm, Field D* algorithm, IDA* algorithm, Fringe algorithm, Fringe Saving A* (FSA*) algorithm, Generalized Adaptive A* (GAA*) algorithm, Lifelong Planning A* (LPA*) algorithm, Simplified Memory bounded A* (SMA*) algorithm, Jump point search algorithm, or Theta* algorithm.

In one particular embodiment, the traveled route is determined using an A* algorithm, which uses a best first search approach and finds a least-cost path from a given initial node to one goal node (out of one or more possible goals). As the A* algorithm traverses the graph, it follows a path of the lowest expected total cost or distance, keeping a sorted priority queue of alternate path segments along the way. The algorithm may search the routes that appear to be most likely to lead towards the goal. The algorithm may also take the distance already traveled into account. Starting with the initial node, the A* algorithm maintains a priority queue of travel nodes or points to be traversed, known as an open set or fringe.

The A* algorithm may also use a knowledge-plus-heuristic cost function of node x (usually denoted f(x)) to determine the order in which the search visits nodes in the tree. In certain embodiments, the cost function is a sum of two functions: (1) the past path-cost function, which is the known distance from the starting node to the current node x (usually denoted g(x)), and (2) a future path-cost function, which is a "heuristic estimate" of the distance from x to the goal (usually denoted h(x)). The lower f(x) for a given node x, the higher its priority. At each step of the algorithm, the node with the lowest f(x) value may be removed from the queue, the f and g values of its neighbors may be updated accordingly, and these neighbors may be added to the queue. The algorithm may continue until a goal node has a lower f value than any node in the queue (or until the queue is empty). The f value of the goal is then the length of the shortest path, since h at the goal is zero in an admissible heuristic.

The algorithm described so far gives only the length of the shortest path. To find the actual sequence of steps, the algorithm may be revised so that each node on the path keeps track of its predecessor. After this algorithm is run, the ending node will point to its predecessor, and so on, until some node's predecessor is the start node, wherein a reconstructed route is determined.
Calculating Alternative Paths Following reconstructing the traveled route, an algorithm may be implemented to calculate any alternative paths or missed faster travel times between the origin and destination. In certain embodiments, the calculation occurs "after-the-fact," that is, after the traveled route has already been completed. The algorithm may be a shortest path routing algorithm that searches for the fastest alternative path. In some embodiments, the algorithm may be a back-tracking shortest path routing algorithm that searches for the fastest path by starting at the destination/arrival location and working backwards to the origin (e.g., a decrease order of time (DOT) search algorithm). Such DOT-type searches may take advantage of all of the real-time traffic information already collected for the day up to the destination time (i.e., "after-the-fact" traffic data). In some embodiments, the backward calculating DOT search algorithm approach may be computationally more efficient than a forward approach (i.e., beginning at the origin).

In certain embodiments, different data may be used to determine an alternative route or missed faster travel time between the origin and destination. For example, the alternative route may be based on certain factors such as current real-time traffic, historical traffic, future (forecasted) traffic conditions, map speeds (e.g., posted speed limits between the origin and destination), and combinations thereof (e.g., current traffic data and historical traffic data, current traffic data and forecasted traffic data). For example, current real-time traffic may take into account the traffic information collected by a traffic service provider for various roadways in the same time frame as the traveled path. Historical traffic data may include data compiled by a traffic service provider over a period of time for the various roadways in the vicinity of the origin and destination locations. The historical data may rely on gathered traffic information at a similar time of day (e.g., rush hour or off-peak), day of week (e.g., weekday or weekend), and/or day of year (e.g., holiday or work day). Forecasted traffic data may include data compiled by a traffic service provider based on predicted traffic patterns using historical and/or current traffic data. Map speed data may include data compiled by a traffic service provider based on a predicted travel time along a series of roads based on the posted speed limits along those roads.

For each alternative route calculated, an amount of data is generated. The generated data may include the total travel time for the alternative route, the GPS trajectory or travel path of the alternative route, any traffic incidents or construction along the route (e.g., accidents or lane closures), or any weather factors influencing travel along the route (e.g., rain, snow, ice).
Comparing Alternative Paths with Traveled Path Following determination of alternative or missed faster travel routes, the alternative routes and the traveled route may be compared. The analysis may include comparing: (1) the difference in total travel time between the alternative and traveled routes, (2) the difference in total travel distance between the alternative and traveled routes, and/or (3) the difference in total fuel consumed between the alternative and traveled routes. In some embodiments, the total time of the traveled route used in the analysis may be the actual travel time taken by the specific driver. In other embodiments, the total time of the traveled route used in the analysis may be an average travel time for a plurality of drivers at approximately the same time. The data for the additional drivers may be extracted from a map developer database.

In certain embodiments, each alternative route may be given an overall score or rating based on the comparison between the alternative route and traveled route. For example, the overall score or rating of the alternative route may be on a 0-10 scale, where 0 indicates a poor performance and 10 indicates a best performance. The determination of the score may take one or more analyzed factors into account (e.g., total travel time). In one embodiment, the overall score may be based on a comparison of the total travel times between the alternative and traveled routes.

Publishing and Reporting Comparison

Following the comparison of the alternative and traveled routes, the analyzed data may be compiled and published. In certain embodiments, the analyzed data may be provided to a navigation device or service provider or an end user of the navigation device itself. The published or reported data may include the fastest travel time and path between the origin and destination at a specific time of departure.

In some embodiments, the end user or map developer (e.g., navigation device/service provider or traffic service provider) may select which factors to compile and publish. For example, an end user or navigation device or service provider may only be interested in determining alternative or missed faster travel time routes based on the real-time traffic data on the day the traveled route was taken. In other embodiments, the end user or navigation device or service provider may be interested in every possible missed faster route based on data available to the traffic service provider (such as real-time traffic data, historical traffic data, and/or projected/future traffic data).

Therefore, the traffic service provider may compile, format, and report data (e.g., alternative routes) to the end user or navigation device or service provider based on the type of information requested or purchased by the end user or navigation device/service provider. The reported data may include traffic incidents, traffic construction, or weather delays along the alternative routes reported. Additionally, the reported data may exclude any incidents, construction, or weather on additional alternative routes analyzed by the traffic service provider but not requested by the end user or navigation device/service provider.

Table 2, shown below, includes one example of the trajectory data compiled for reporting to an end user or navigation device/service provider.

TABLE 2

Reported Data

| Parameter | Value type |
| --- | --- |
| Vehicle ID | Alphanumeric |
| Navigation Device or Service Provider ID | Alphanumeric |
| Travel time (actual time for specific driver) | Hours (floating number) |
| Average Travel time (average travel time for a plurality of drivers) | Hours (floating number) |
| Fastest Travel time | Hours (floating number) |
| Fastest Travel path (determined from alternative paths analyzed) | GPS trajectory |
| Alternative Route #1 Travel time (based on real-time traffic) | Hours (floating number) |
| Alternative Route #2 Travel time (based on real-time and historical traffic) | Hours (floating number) |
| Alternative Route #3 Travel time (based on real-time and future traffic) | Hours (floating number) |
| Alternative Route #4 Travel time (based on historical traffic) | Hours (floating number) |
| Alternative Route #5 Travel time (based on posted speed limit data) | Hours (floating number) |
| Alternative Route #1 trajectory | GPS trajectory |
| Alternative Route #2 trajectory | GPS trajectory |
| Alternative Route #3 trajectory | GPS trajectory |
| Alternative Route #4 trajectory | GPS trajectory |
| Alternative Route #5 trajectory | GPS trajectory |
| Incidents | Number (of incidents along route) |
| Construction | Number (of construction zones along route) |
| Rain | Number (of rain delay locations along route) |
| Snow/Ice | Number (of snow delay locations along route) |
| Difference in Travel time between Alternative Route #1 and Traveled Route | Hours (floating number) |
| Difference in Travel time between Alternative Route #2 and Traveled Route | Hours (floating number) |
| Difference in Travel time between Alternative Route #3 and Traveled Route | Hours (floating number) |
| Difference in Travel time between Alternative Route #4 and Traveled Route | Hours (floating number) |
| Difference in Travel time between Alternative Route #5 and Traveled Route | Hours (floating number) |
| Overall Score for each alternative route | Number (0-10 scale) |

Updating Database

In certain embodiments, following analysis of the alternative routes and traveled route, the differences in traveling times between the alternative routes and traveled route may be used to help improve a map developer's database. In other words, based on the added information learned from the after-the-fact analysis, a map developer may use the information to continuously improve a map database. The added knowledge may allow a developer to provide improved traffic routing suggestions to navigation device or service providers and their end users.

Flowchart Embodiment

FIG. 1 illustrates an example flowchart for measuring quality in optimal navigation routes. The process of the flowchart may be performed by a navigation device and its processor and/or a server and its processor. Alternatively, another device may be configured to perform one or more of the following acts. Additional, fewer, or different acts may be included.

At act S101, a plurality of nodes is received from a navigation device. Each node in the plurality of nodes includes latitude-longitude coordinates and a time stamp. The plurality of nodes may be pushed from the navigation device to a map developer through a hypertext transfer protocol (HTTP) push interface.

At act S103, the nodes having latitude and longitude coordinates are map matched with a road network. In the map matching process, incoming trajectory data may be aligned to the road or a specific lane on the road. The map-matching process may consider the distance between the trajectory data and the road, as well as a heading value of the navigation device and heading value of the road.

At act S105, a traveled route of the navigation device is determined from the map matched data. The traveled route includes determined origin and destination locations. The traveled route may be determined using a search algorithm such as an A* algorithm.

At act S107, at least one alternative route or missed faster travel time between the origin and destination locations may be calculated. The algorithm used to determine the route may be a shortest path routing algorithm that searches for the fastest alternative path such as a decrease order of time (DOT) search algorithm. Different data may be used to determine an alternative route or missed faster travel time between the origin and destination such as current real-time traffic, historical traffic, future (forecasted) traffic conditions, posted map speeds, and combinations thereof.

At act S109, the at least one calculated alternative route may be compared with the traveled route. The comparison may include comparing: (1) the difference in total travel time between the alternative and traveled routes, (2) the difference in total travel distance between the alternative and traveled routes, and/or (3) the difference in total fuel consumed between the alternative and traveled routes.

At act S111, the comparison data may be formatted, published, and reported. The data may be reported to a traffic service provider or map developer for updating a traffic database. Alternatively, or additionally, the comparison data may be reported to a navigation device/service provider or end user of the navigation device.

Navigation Devices and Systems

Figure 2:
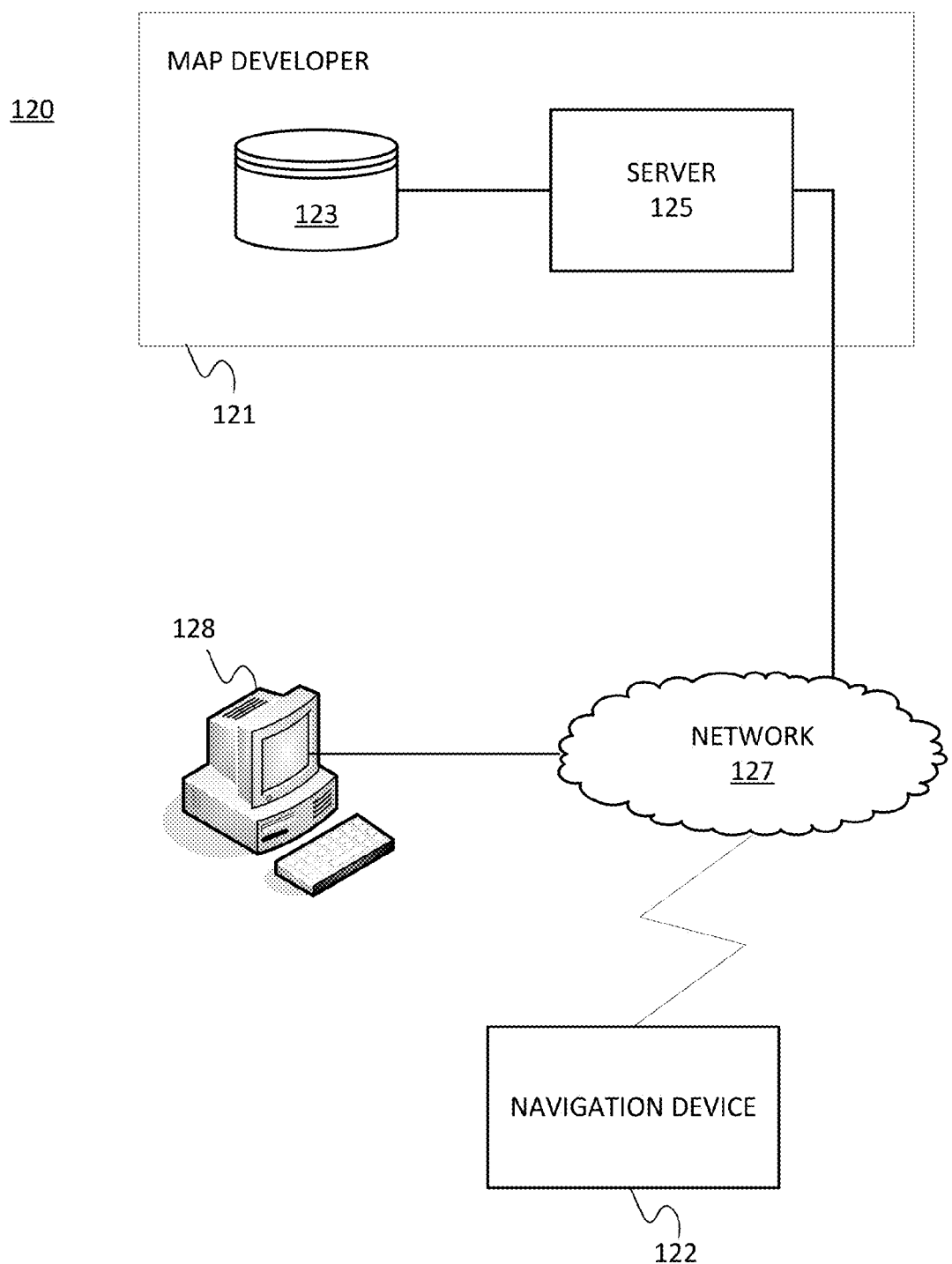
FIG. 2 illustrates an exemplary navigation device of the system of FIG. 1.

As discussed above, measuring and analyzing quality in optimal routing paths may be performed by a navigation device and its processor and/or a server and its processor. FIG. 2 illustrates one embodiment of a traffic navigation system 120. The system 120 may include a map developer system 121, a navigation device 122, a workstation 128, and a network 127. Additional, different, or fewer components may be provided.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom. In certain embodiments, the navigation device 122 is transported in or on a vehicle (e.g., car, truck, motorcycle, bus, bicycle, boat). In other embodiments, the navigation device 122 is transported on a pedestrian traveler.

The map developer system 121 includes a server 125 and a server database 123. The developer system 121 may include computer systems and networks of a system operator such as HERE, NAVTEQ, or Nokia Corporation. The server database 123 is configured to store traffic map images developed from historical traffic data or predictive traffic data. The database 123 is also configured to store identification keys associated with the traffic map images.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

Figure 3:
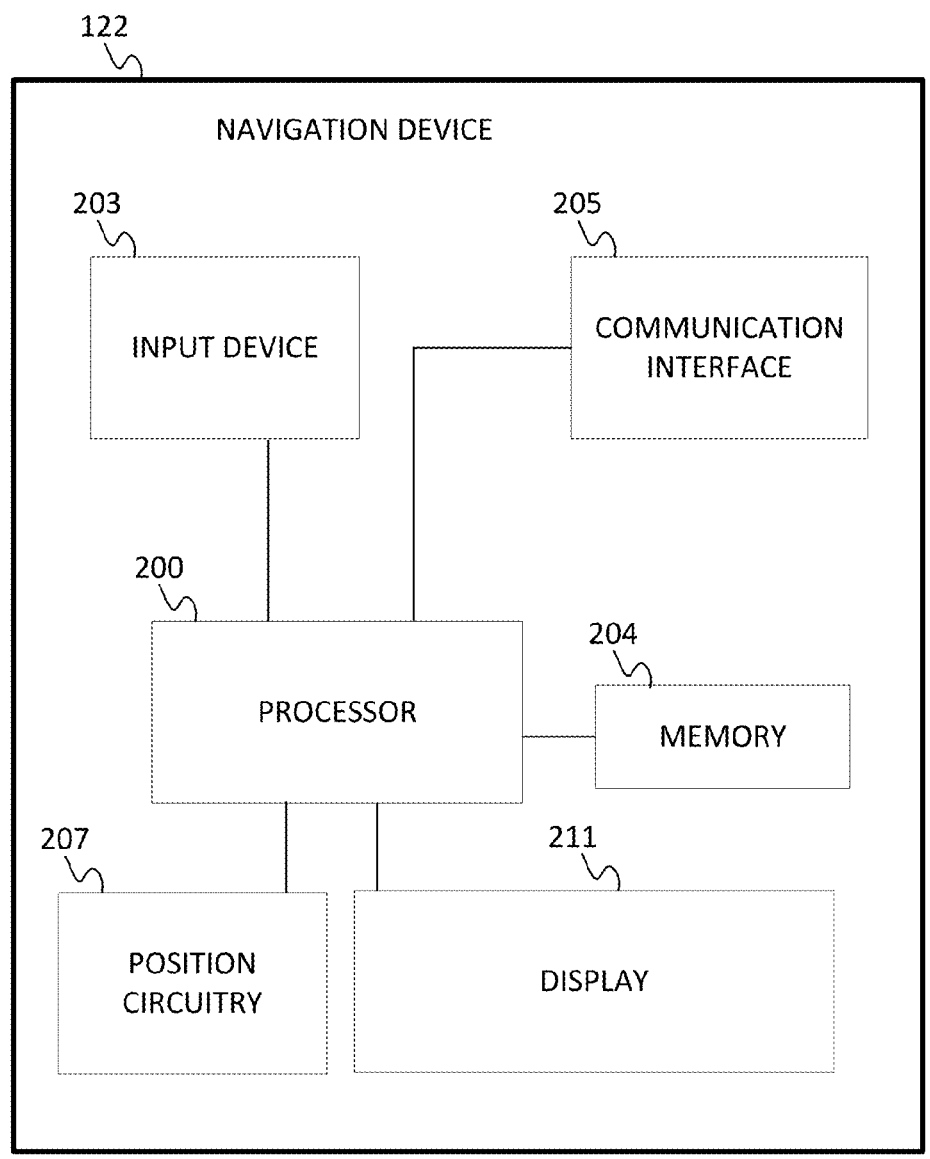
FIG. 3 illustrates an exemplary server of the system of FIG. 1.

FIG. 3 illustrates an exemplary navigation device 122 of the system of FIG. 2. The navigation device 122 includes a processor 200, a memory 204, an input device 203, a communication interface 205, position circuitry 207, and a display 211. Additional, different, or fewer components are possible for the mobile device/personal computer 122.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 4:
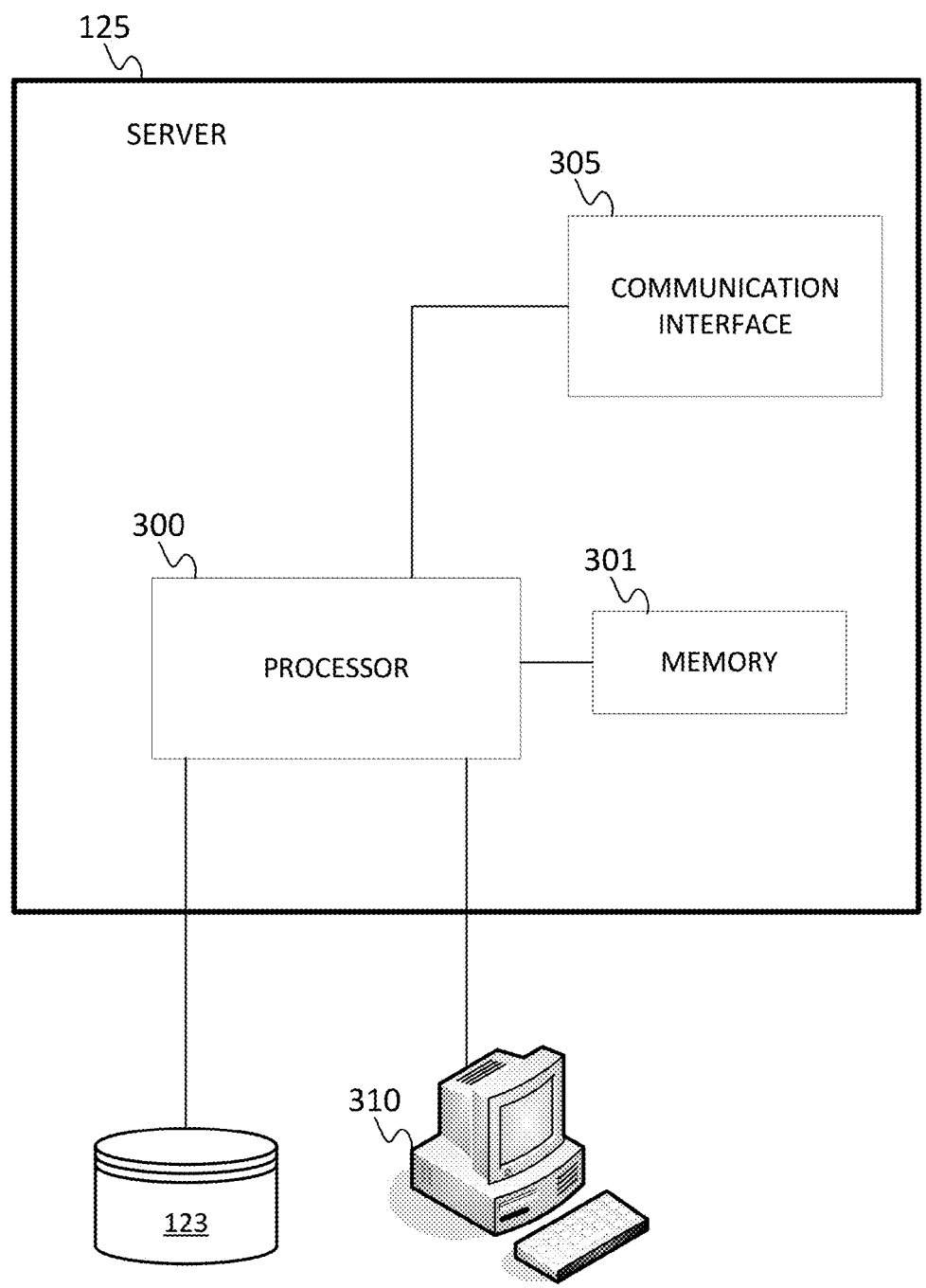
FIG. 4 illustrates an example flowchart determining an optimal traffic route and comparing the optimal route with a traveled route.

FIG. 4 illustrates an exemplary server 125 of the system of FIG. 2. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of the methods described above. For example, the navigation device processor 200 may be configured to perform the process of: (1) receiving plurality of nodes from a navigation device, each node comprising latitude and longitude coordinates and a time stamp; (2) map matching the plurality of nodes with a road network; (3) determining, using the map matched nodes, a traveled route of the navigation device between an origin and destination; and (4) calculating an alternative route between the origin and destination.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In certain embodiments, determination and retrieval of a traffic map image on the navigation device may be used to provide functions for an "autonomous vehicle" or "highly assisted driving (HAD) vehicle." As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The navigation device 122 or another computer system in communication with the navigation device 122 may include instructions for routing or operating the autonomous or highly assisted driving vehicle. An estimated travel time may be calculated based on the traffic map data and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
receiving, using a processor, a plurality of nodes from a navigation device, each node comprising latitude and longitude coordinates and a time stamp;
map matching the plurality of nodes with a road network;
determining, using the map matched nodes, a traveled route of the navigation device between an origin and destination;
calculating an alternative route between the origin and destination at a time after the traveled route is completed;
comparing the alternative route with the traveled route to provide comparison data, wherein the comparing comprises determining: a difference in total travel time between the alternative route and the traveled route, a difference in total travel distance between the alternative route and the traveled route, or a combination thereof; and
reporting the comparison data to the navigation device or a navigation service provider.

2. The method of claim 1, wherein the receiving comprises pushing the plurality of nodes to a map developer through a hypertext transfer protocol interface.

3. The method of claim 1, wherein the traveled route is determined using an A* algorithm.

4. The method of claim 1, wherein the alternative route is calculated using current real-time traffic data, historical traffic data, forecasted traffic data, posted speed limit data, or combinations thereof.

5. The method of claim 1, wherein the alternative route is calculated using a decreased order of time search algorithm.

6. The method of claim 1, further comprising ascertaining an overall score for the alternative route based on the comparison data.

7. The method of claim 1, further comprising updating a map database of potential travel paths using the comparison data.

8. A method comprising:
receiving, using a processor, a plurality of nodes from a navigation device, each node comprising latitude and longitude coordinates and a time stamp;
map matching the plurality of nodes with a road network;
determining, using the map matched nodes, a traveled route of the navigation device between an origin and destination;
calculating a faster alternative route between the origin and destination, at a time after the traveled route is completed, using current real-time traffic data, historical traffic data, forecasted traffic data, posted speed limit data, or combinations thereof;
comparing the faster alternative route with the traveled route to provide comparison data including a difference in total travel time between the faster alternative route and the traveled route; and
reporting the comparison data to the navigation device or a navigation service provider.

9. An apparatus comprising:
at least one processor; and
at least one non-transitory memory including computer program code for one or more programs; the at least one non-transitory memory and the computer program code configured to, with the at least one processor, cause the apparatus to at least perform:
receive plurality of nodes from a navigation device, each node comprising latitude and longitude coordinates and a time stamp;
map match the plurality of nodes with a road network;
determine, using the map matched nodes, a traveled route of the navigation device between an origin and destination;
calculate an alternative route between the origin and destination at a time after the traveled route is completed;
compare the alternative route with the traveled route to provide comparison data, wherein the comparing comprises determining: a difference in total travel time between the alternative route and the traveled route, a difference in total travel distance between the alternative route and the traveled route, or a combination thereof; and
report the comparison data to the navigation device or a navigation service provider.

10. The apparatus of claim 9, wherein the plurality of nodes is received by pushing the plurality of nodes through a hypertext transfer protocol interface.

11. The apparatus of claim 9, wherein the traveled route is determined using an A* algorithm.

12. The apparatus of claim 9, wherein the alternative route is calculated using current real-time traffic data, historical traffic data, forecasted traffic data, posted speed limit data, or combinations thereof.

13. The apparatus of claim 9, wherein the alternative route is calculated using a decreased order of time search algorithm.

14. The apparatus of claim 9, wherein the at least one non-transitory memory and the computer program code are configured to cause the apparatus to further perform:
    ascertain an overall score for the alternative route based on the comparison data.

15. The apparatus of claim 9, wherein the at least one non-transitory memory and the computer program code are configured to cause the apparatus to further perform:
    update a map database of potential travel paths using the comparison data.

\* \* \* \* \*